United States Patent Office 3,435,809
Patented Apr. 1, 1969

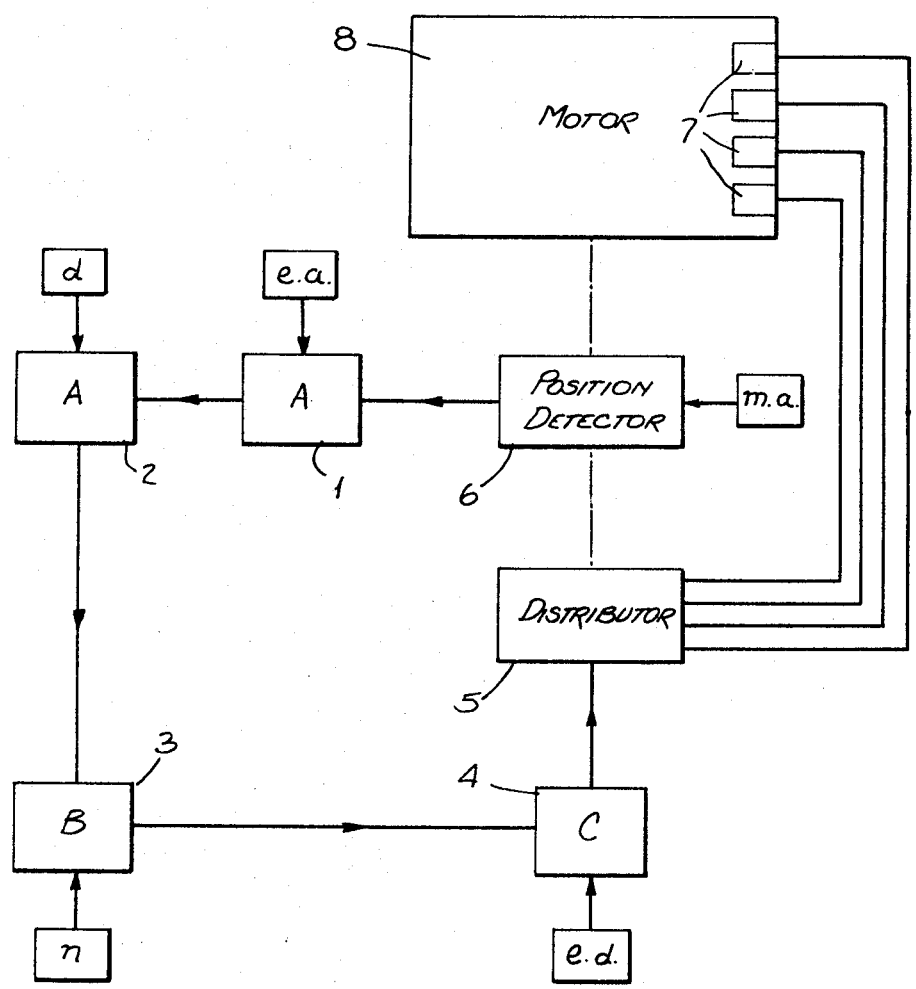

3,435,809
DEVICE FOR THE CONTROL OF FUEL INJECTION
Jacques Bassot, Paris, and Louis Monpetit, L'Etang-la-Ville, France, assignors to Societe des Procedes Modernes d'Injection Sopromi, Boulogne, Hauts-de-Seine, France
Filed Apr. 28, 1966, Ser. No. 546,008
Claims priority, application France, Apr. 29, 1965, 15,109
Int. Cl. F02m *51/00*
U.S. Cl. 123—119                              15 Claims

ABSTRACT OF THE DISCLOSURE

A monostable circuit, consisting of two transistors both of which are blocked and conducting simultaneously, generates a timing signal whose duration varies as a function of a first engine parameter, when the shaft of the engine reaches a certain angular position. A unijunction transistor pulse generating circuit generates short pulses for the duration of the timing signal. The number of short pulses generated depends on a second motor parameter. These pulses are fed to a three transistor power circuit, which generates high power pulses equal in number to the pulses generated by the pulse generating circuit, but each having a duration which is a function of a third engine parameter. These power pulses energize transducers which inject fuel into the engine as a function of the power pulses received by the transducers.

---

This invention relates to a device for controlling the injection of fuel into engines.

In internal combustion engines, it is known to effect the injection of fuel by means of an injection pump comprising a plunger which is operated by means of a cam. The profile of this cam is so designed as to apply a predetermined law of fluid flow at the level of the injectors, said pump being operated from the camshaft in synchronism with the commencement of injection.

This arrangement is subject to a number of drawbacks and, in particular, the law of fluid flow is not complied with when variations occur in temperature, speed of rotation of the engine and state of the pump.

Furthermore, either one pump and one injector per cylinder are employed or else a distributor pump is employed with a view to delivering an equal quantity of fuel to each cylinder, which is very difficult to carry into practice. Moreover, injection pumps in particular are made with very high mechanical precision and are therefore very costly.

So far as the injectors are concerned, they are usually counteracted by a calibrated spring and lifted by the pressure of fluid. Certain types of injectors are operated mechanically by means of levers or electro-magnetically but have a very high inertia.

It is also known to effect the injection on the principle of intermittent delivery by utilizing the shock waves reflected from the injection pipes to lift the injector pintle or needle-valve. It is possible to obtain in this case up to three injections at a given speed of rotation of the engine and under a certain load.

From the foregoing, it may be concluded that the high-precision equipment of the type referred-to is not only costly but proves satisfactory only insofar as it achieves partial results. In point of fact, the settings obtained are only valid in respect of a given running speed and cannot be modified during operation.

The object of the present invention is to provide an injection control system which effectively circumvents the disadvantages mentioned and which is endowed with a high degree of flexibility.

SUMMARY OF INVENTION

It is an object of this invention to furnish an electronic control system for controlling the fuel injection in an internal combustion engine having a shaft, as a function of a plurality of engine parameters. Said system comprises a position detector for generating a position signal as a function of the position of said engine shaft. It further comprises timing means adapted to generate a timing signal in such a manner that the start of said timing signal is a function of said position signal, while the duration of said timing signal is a function of a first engine parameter. Pulse generating means are furnished to generate a plurality of short pulses within the duration of said timing signal, in such a manner that the number of said plurality of pulses is a function of a second engine parameter. Power means are furnished, said power means being adapted to furnish a plurality of power signals corresponding to said plurality of power pulses, in such a manner that the width of each individual power signal is a function of a third engine parameter. Finally, transducing means are furnished to receive said power signals and inject fuel into said engine as a function thereof.

A clearer understanding of the invention will be gained from the accompanying drawings which are given by way of indication, and in which:

FIG. 7 is a simplified symbolic diagram of one example of construction of an injection control system in accordance with the invention.

FIGS. 1 to 6 represent circuits which are fully transistorized and supplied with direct current at a low voltage (for example 12 v.).

The transistors which are employed all operate on the all-or-none principle, namely in the saturation or blocking state. These arrangements practically permit the elimination of thermal drift. The circuits shown in the diagrams are of three types which correspond to different functions.

Figure 1:
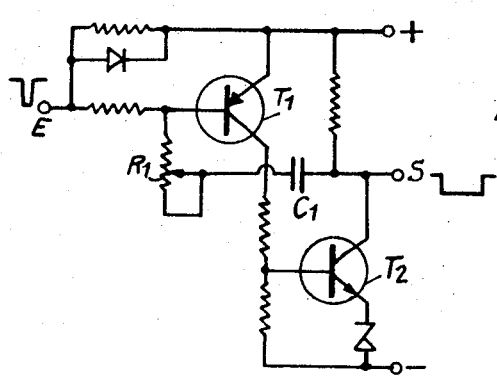
FIGS. 1 and 2 are simplified electrical diagrams of two examples of construction of monostable circuits as employed in the electronic chain for fuel injection control in accordance with the invention.
Figure 2:
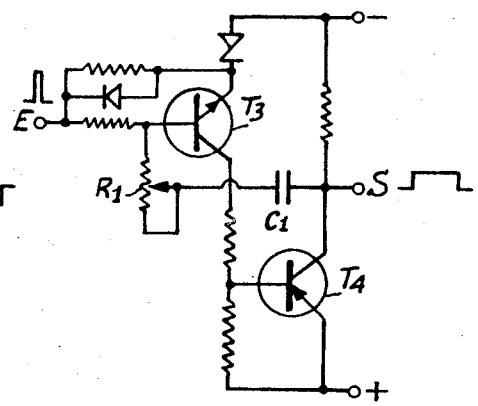

The circuits of type A which correspond to FIGS. 1 and 2 are circuits which are well-known per se, namely of the monostable multivibrator type which are preferably constituted by means of complementary p-n-p/n-p-n transistors or conversely or, in other words, are preferably of the "on-on/off-off" type. Either of these circuits may be used as variable delay means or as timing means, that of FIG. 1 being used when the negative supply terminal is grounded, while that of FIG. 2 is used when the positive voltage supply terminal is grounded.

In FIG. 1, the two transistors T1 and T2 are normally blocked. The arrival of a negative pulse at the input terminal E initiates the unblocking of the transistor T1 which in turn initiates the unblocking of the transistor T2 and charges the capacitor C1 through the variable resistor R1 with a time constant which determines the tripping time of the monostable circuit, that is to say the width of the output signal which is available at the terminals. Said width of output signal can be regulated by producing action on the variable resistor R1.

Similarly, in FIG. 2, the arrival of a positive pulse at the input terminal E initiates the unblocking of the transistor T3 which in turn unblocks the transistor T4. The duration of the positive output signal which is present at the terminals can be regulated by producing action on the resistor R1.

In FIG. 1, a negative pulse applied to the input terminal E of the circuit makes it possible to obtain a signal of rectangular waveform having the same sign at the output terminal S.

In FIG. 2, a positive pulse applied to the input terminal E serves to obtain a rectangular signal having the same sign at the output terminal S.

Figure 3:
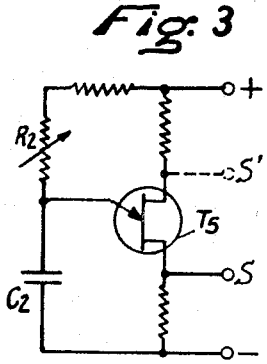
FIGS. 3, 4 and 5 are simplified electrical diagrams of three examples of construction of pulse-generating circuits as employed for the purpose of determining the number of unitary injections.
Figure 4:
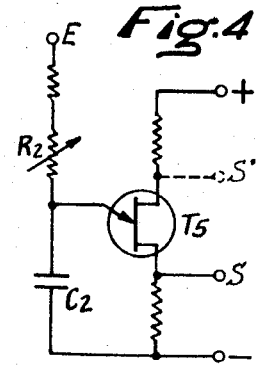
Figure 5:
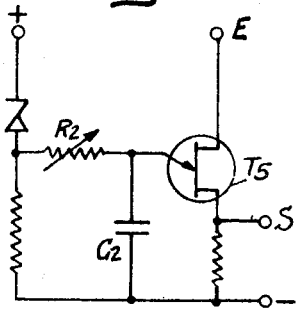

FIGS. 3, 4, and 5 show three embodiments of pulse generating means.

The circuits of type B which correspond to FIGS. 3, 4 and 5 are pulse-generating circuits. They are preferably formed from a single transistor of the unijunction type and are employed either as pulse generators (as shown in FIG. 3) or as "choppers" for modulating a signal which is applied to the terminal E (as shown in FIGS. 4 and 5).

In FIG. 3, the unijunction transistor T5 which is normally blocked becomes conductive and delivers pulses with a recurrence frequency which is determined by the time constant of charge of the capacitor C2 through the variable resistor R2. By modifying the value of the resistance R2, it is therefore possible to modify the pulse recurrence frequency.

In FIG. 4, the unijunction transistor T5 is normally blocked when no signal is applied to the terminal E. If a rectangular signal is applied to said terminal E, the capacitor C2 is charged with a time constant which is dependent on the value of R2, and the transistor T5 is unblocked and delivers a pulse with a recurrence frequency which is dependent on said time constant.

In FIG. 5, the transistor T5 is unblocked immediately upon the appearance of a rectangular signal at the terminal E. The output pulses are emitted at the terminal S with a recurrence frequency which is determined by the time constant of charge of capacitor C2.

In the circuits which are shown schematically in FIGS. 3 and 4, the pulses can if necessary be taken from the auxiliary output terminal S'.

Figure 6:
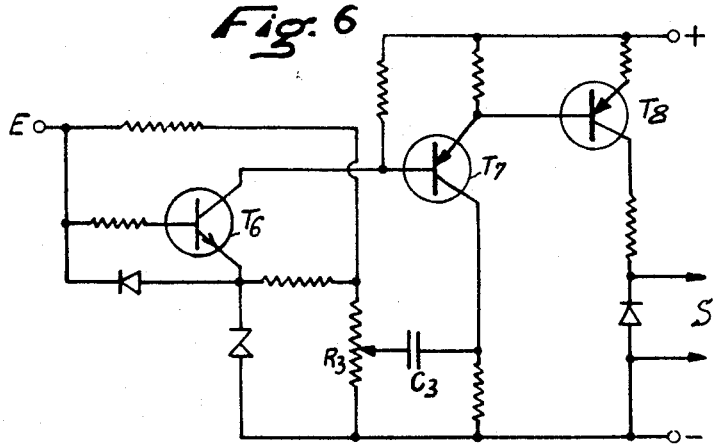
FIG. 6 is a simplified electrical diagram of one example of construction of a monostable circuit for controlling a power transistor which is built into the circuit.

An embodiment of power means for furnishing unitary power signals of controllable width is shown in FIG. 6.

The circuit of type C which corresponds to FIG. 6 is of the monostable multivibrator type and controls a power transistor T8 which is built into the circuit. The element for regulating the tripping time is the capacitor-resistor assembly C3–R3. This type of circuit is preferably established by making use of transistors which are all simultaneously in their blocked state or in other words is of the on-on-on/off-off-off type. The circuit delivers a signal of rectangular waveform at S in response to a pulse which appears at the input terminal E.

The circuits of these different types are employed in electronic chains which are preferably established by the association of complementary circuits either by direct coupling or by way of a Zener diode in such a manner as to reduce to a minimum the transfer time constants which are introduced by capacitive couplings.

In the FIG. 7 embodiment the engine 8 is of the internal combustion type. The ignition may be either by compression, as in the case of diesel engines, or by artificial means, as is the case when spark ignition is employed. The fuel injection into the engine may be either by direct injection into the cylinder, or by indirect injection as where the fuel is injected into the intake manifold.

The term "position detector" as designated by the reference numeral 6 is understood to mean an apparatus which is designed to deliver either an electrical signal or a signal which can readily be converted to an electrical signal, as and when the engine crankshaft passes through one or a number of given and mechanically-determined positions. The position detectors can be of two classes: a class I or so-called "pulse" class wherein the position detector delivers a pulse as and when the crankshaft passes through the indicated position; and a class II or so-called "maintenance" class wherein the signal delivered by the position detector changes over from a so-called quiescent state to a so-called working state as the crankshaft passes through a given position and remains in said working state until the crankshaft passes through another given position.

A position detector of class I accordingly delivers a transient signal or pulse each time the engine crankshaft passes through one or a number of mechanically predetermined positions, whereas a position detector of class II delivers a given signal over a period of time which corresponds to a certain angle of rotation of the engine.

When position detectors of a given class are employed, detectors of the other class can readily be provided. The electrical means which are made available for this purpose are particularly flexible. For example, the "shunting" of the electrical signal delivered by a position detector of class II makes it possible to obtain the same signal as a class I detector, provided that one of the pulses (of opposite polarity) is eliminated by a rectifier element (such as a diode, for example). Conversely, when making use of a position detector of class I which delivers a pulse in respect of position $a$ of the crankshaft and another pulse in respect of position $b$, it is possible to change over to the signal which would be delivered by a class II detector which is inserted between $a$ and $b$, simply by interposing a circuit of the bistable type.

It should be noted that the signals delivered by the position detectors are in all cases low-power signals. In fact, the power which is necessary for the purpose of driving an electronic device is small, and the sensitivity of said device is regulated solely as a function of the signal-to-noise ratio.

The position detectors can be constructed by making use of a wide range of devices such as platinum contacts, photoelectric cells (preferably photodiodes, phototransistors, photoresistors), magnetic detectors either of the simple type or of the magnet type, variable capacitors, radioisotope detectors.

One of the essential characteristics which must govern the choice of the detector is the inherent efficiency of the electrical signal which is delivered by the position detector, said signal being additionally of low power.

It is consequently advisable to dispense with devices which are in any way responsive to erratic phenomena which are due to mechanical causes such as contact bouncing or simply to deficient cleanliness.

Excellent and preferred position detectors which are both simple in design and economical to manufacture consist of photoelectric cells, provided that such cells are functionally efficient, and magnetic detectors which are made very simply by means of a magnetic circuit which is energized by direct current and comprises an air-gap in which a ferro-magnetic stud or sector is inserted, the engagement and disengagement of this moving member each supplying an electrical pulse to the control circuit.

In addition, the low power levels controlled by the position detectors permit the utilization of flexible-blade switches which have high functional efficiency, are inexpensive and extremely easy to operate. The device last mentioned makes it possible if necessary to reduce the "advance" circuit referred-to-below to a simple resistor-capacitor circuit.

So far as concerns the location of the position detectors, very flexible solutions can be contemplated; in particular, index marks can be provided on the flywheel or any other rotating member; an alternative solution would be to provide a special drive connection of a type similar to that which serves to actuate the conventional distributor rotor; in the case of a multi-cylinder engine, the solution last mentioned appears to be of particular interest, especially if the engine is already provided with a drive connection of this type.

The distributor 5 is a device which can usefully be employed only in the case of multi-cylinder engines, and by means of which the power signals delivered by the electronic control chain are distributed in turn to each injector system 7 of each cylinder. The distributor can evidently be dispensed with if each injector is equipped with a separate electronic chain. However, this solution entails an excessive increase in the number of controls and elements.

One noteworthy feature of the invention lies in the fact that the distributor, which is designed in the form of an electric power system (or very simply a rotary contact), does not involve any "switching" operation. In point of fact, the distributor closes then opens the circuit of each injector at zero voltage and current intensity, switching being effected only by the power transistor of the electronic chain while the circuit is established. Ideal conditions are thus provided for ensuring long service life of the distributor since this latter is in no way subject to such hazards as arcing of contacts which otherwise occur in the case of on-load switching by mechanical means.

One expedient which appears rational is to combine the "detector-distributor" in a single unit. A device is thus provided which is fairly similar to a conventional ignition distributor in which similar functions are usually grouped together in a single unit (distributor rotor and breaker contacts). However, it should be noted that each device operates in the case of electronic control injection under much less exacting conditions than those of conventional ignition devices and that, in addition, if the electronic advance system referred-to above is contemplated, the detector-distributor unit is much more simple than a conventional ignition system.

Referring now to FIG. 7, a complete electronic control chain will now be described.

The engine 8 drives the distributor 5 which can be coupled with the position detector 6 so as to form a single unit.

The signal provided by the position detector 6 is coupled to an electric circuit 1 which is, as indicated in FIG. 7, a type A circuit such as illustrated in FIGS. 1 and 2. This electric circuit 1 functions as a variable delay means to provide an output pulse signal which is coupled to the electric circuit 2. The electric circuit 2, as indicated in FIG. 7, is a type A circuit such as illustrated in FIGS. 1 and 2. The electric circuit 2 functions as a means to control the total injection time period. The rectangular output signal from the electric circuit 2 is coupled to a pulse generating circuit 3. The pulse generating circuit 3 is, as indicated in FIG. 7, a type B electric circuit such as illustrated in FIGS. 3 to 5. The output pulses from the pulse generating circuit 3 are coupled to the power means circuit 4 to provide as the output of the circuit 4 a plurality of power signal pulses of controllable width. The power pulse circuit 4 is, as indicated in FIG. 7, of the type illustrated in FIG. 6. The output power pulses from the power means 4 controls the injectors 7, by way of the distributor 5.

The arrows leading from the blocks labeled $ma$, $ea$, $d$, $n$ and $ed$ indicate various inputs that may be employed to provide control and regulation by various engine parameters. These inputs operate on the variable elements (such as the resistors $R_1$, $R_2$ and $R_3$) of the electrical circuits illustrated in FIGS. 1 through 6. The symbol $ma$ corresponds to the mechanical advance, the symbol $ea$ corresponds to the electronic advance, the symbol $n$ corresponds to the number of unitary injections, the symbol $ed$ corresponds to the duration of one unitary injection, and the symbol $d$ corresponds to the total injection time.

The signals which represent these symbols may be derived, as indicated below, from transducers coupled to the engine to measure various physical parameters of the engine.

The term "regulation" as employed in the remainder of the description will be understood to mean any modification which is made in a given setting in accordance with a predetermined program by fully automatic means, starting from the variation of a physical parameter or combination of physical parameters.

The term "control" is intended to designate hereinafter any modification which is made intentionally in a given setting or program by the engine operator or driver, usually by hand.

The electronic chain is made up of a series of circuits. Each of the circuits mentioned is adapted to be regulated and/or controlled from orders transmitted in electrical form (e.g. voltage, current, power variation of resistance or capacitance) or in mechanical form (rectilineal or angular motion). In fact, all of the physical parameters to be contemplated in the case of an engine (temperature, pressure, speed, acceleration) are capable of electrical or mechanical "conversion" by means of simple methods.

For example, a variation of temperature can be converted into an electrical signal by means of an electric probe either of the resistance or thermistance type, or into a displacement by means of a mechanical probe of the bimetallic strip type. A speed can be converted into an electrical signal by means of a D.C. tacho-generator, namely an electric tachometer which operates on the principle of integration of the output current of a circuit of type A; or into a mechanical indication given by a mechanical or electromechanical tachometer.

Conversely, the "controls" (as employed in the sense which has been defined above) are represented by electrical or mechanical data.

As a consequence, each function in an electronic chain can be regulated and/or controlled in a very flexible manner.

Figure 7A:
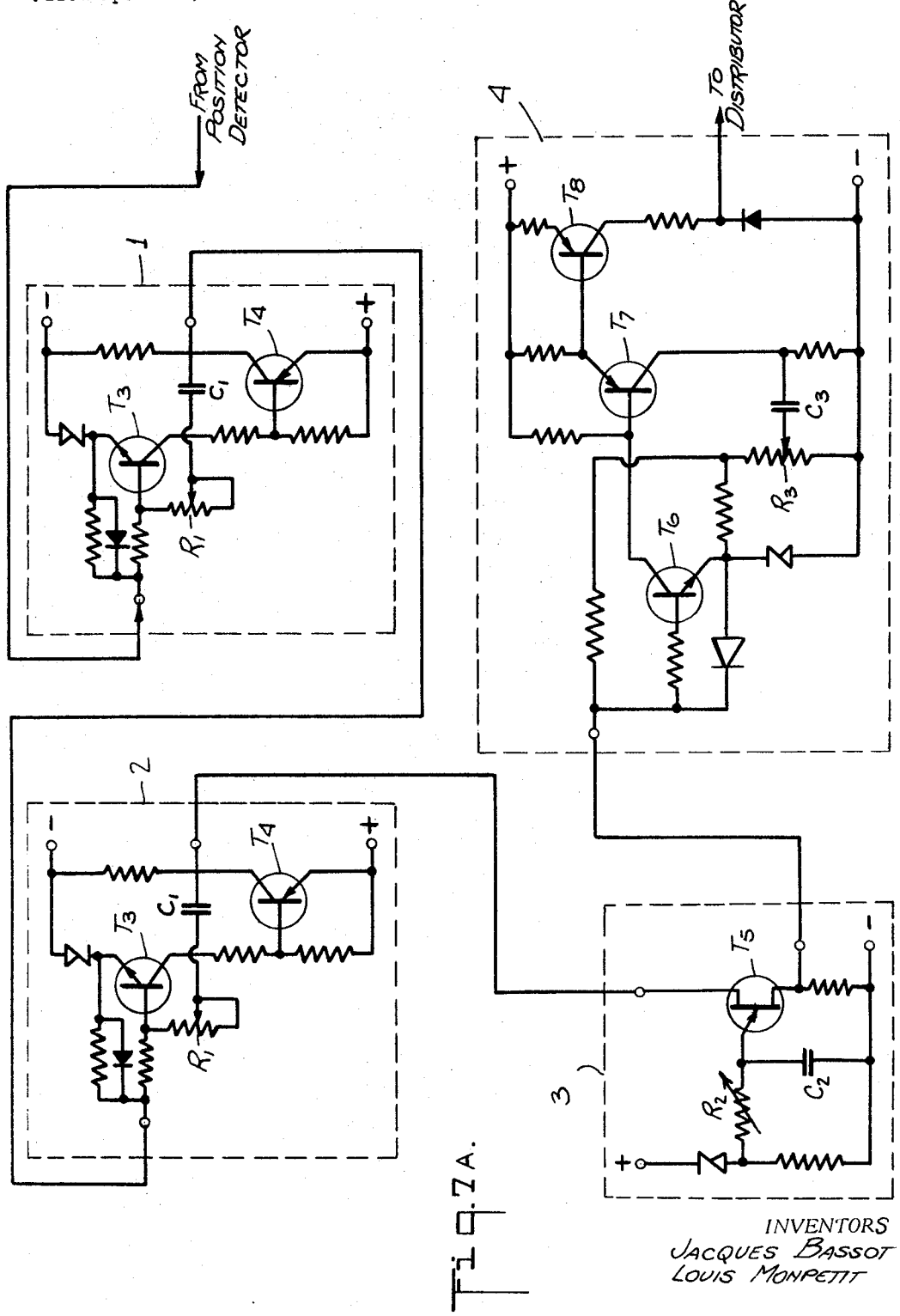
FIG. 7a is a schematic electrical diagram illustrating a specific combination of electrical circuits used in the FIG. 7 arrangement to provide the control signals for controlling the state of the fuel injectors.

FIG. 7a illustrates an example of the electronic circuitry which may be employed to obtain the results described herein. In FIG. 7a, the FIG. 2 type of monostable multivibrators are employed for the variable delay circuit 1 and timing means 2; the FIG. 5 style of pulse generator is employed for the pulse generating means 3; and the FIG. 6 monostable multivibrator power circuit is employed for the power means 4.

The operation of the device which is shown in FIG. 7 is described hereinafter.

A position detector 6, which is provided with inputs $ma$ for controlling the mechanical advance, transmits an electrical pulse to the variable delay circuit 1 when the crankshaft passes through a predetermined position. Circuit 1 transmits said pulse after a time interval $t_1$ to the circuit 2. The time interval $t_1$ is controlled as a function of the input $ea$. The circuit 2 delivers an injection period timing signal (which is a signal of rectangular waveform) having a duration $t_2$. The duration $t_2$ of the injection period timing signal is controlled as a function of a duration control input $d$. The injection period timing signal is applied to the pulse generating circuit 3 to cause the pulse generating 3 to deliver a plurality of control pulses during the time duration $t_2$. The number of control pulses generated by the pulse generating circuit 3 during the time duration $t_2$ is controlled as a function of the input $n$. These control pulses are applied to and "activate" the power circuit 4 which delivers to the distributor 5 (or, if necessary, directly to the injector in the case of a single-cylinder engine) a corresponding number of rectangular power signals, each having a duration $t_3$. The duration $t_3$ of each of these power pulses is controlled as a function of the input $ed$.

In this process, $t_1$ defines the injection advance (or retardation) provided that the position detector gives the maximum advance which is necessary when $t_1=0$;

$t_2$ defines the total injection time; $n$ defines the number of injections performed in the time $t_2$; and $t_3$ defines the time-duration of each unitary injection.

The values obtained in the case of the different variables in a given example of construction are as follows:

| | | |
|---|---|---|
| $t_1$ | milliseconds | 0.1–30 |
| $t_2$ | do | 0.1–15 |
| $n$ | injections | 0–5 |
| $t_3$ | milliseconds | 0.135–15 | wherein the value of 0.135 ms. which corresponds to the minimum time which is necessary in order to produce the mechanical opening of the injector, the needle valve of which must have a very low inertia.

The complete assembly of electronic devices has one essential feature, namely that of delivering a certain power signal from a simple position detector, the power signal being shaped by the electronic device. The injection system which follows will therefore be any system which transforms the electrical power signal into an injection of atomized fuel either into the interior of the engine cylinder or into a chamber which is especially designed for this purpose, or into the induction manifold of the engine.

The "tranducer" (7) which will serve to produce the transition from an electrical signal to a flow of fuel can be constituted by the injector proper (of the electromagnetic type) or else can be constituted by a simple unit (e.g. of an electromagnetic type) as employed for controlling conventional injectors.

Although a number of more or less composite solutions can be contemplated, it will be assumed that the injection device is:

Either solely electrical in the first case; or
Complex in the second case.

In both cases, the fuel supply is effected by means of a pump which merely delivers a sufficient pressure and a sufficient flow but which does not have any metering function. The pump employed is therefore of infinitely more simple design than the injection pumps which are customarily employed.

In the case of a solely electrical injection system, the "transducer" is constituted by the injector proper (of the electromagnetic type). It will be assumed that the system is solely electrical if the injection nozzle which is provided with the usual spray holes is located immediately downstream of the electrically-operated needle-valve or pintle, and if the pressure drops between the needle-valve and the pump, beneath the needle-valve, and between the needle-valve and the spray holes, are small compared with the pressure drops which produce a fuel spray-discharge through the nozzle holes. Under these conditions, inasmuch as the lift of the needle-valve is very rapid, there is no metering variable other than the injector opening time. Fuel metering can accordingly be effected by setting and regulating the injection time by providing an adjustable sequence of short injections characterized by a relatively high flow rate. There is thus acheived in a simple manner a so-called "multi-injection" system which, as is already known, improves the quality of the air-fuel mixture and therefore the combustion process, not only in the case of engines which operate on the principle of ignition by compression but also in the case of engines of the artificial ignition type which operate with either direct injection or indirect injection.

What we claim is:

1. In an internal combustion engine having at least one cylinder, and a fuel injector system to inject fuel during a portion of the engine cycle, the improvement in a control means for controlling the timing and duration of the periods of injection of fuel for each cylinder comprising:

(a) a position detector coupled to whatever cylinders are in the engine for generating a position signal for each cylinder indicating a predetermined position of each cylinder within the engine cycle,
    (b) means for generating a duration control signal,
    (c) timing means for generating an injection period timing signal for each cylinder, said timing means being coupled to said position signal to start said injection period timing signal for each cylnder as a function of the corresponding position signal for that cylinder, said timing means being coupled to said duration control signal to determine the duration of said injection period signal as a function of said duration control signal, the relationship between said duration control signal and said timing means being such that the duration of said injection period signal is no greater than the duration of the engine cycle,
    (d) means to provide a pulse repetition rate signal,
    (e) pulse generating means coupled to said injection period timing signal to provide a plurality of control pulses within the duration of said injection period timing signal, said pulse generating means being coupled to said pulse repetition rate signal to provide the number of said control pulses during a single injection period timing signal that is a function of said pulse repetition rate signal, and
    (f) the fuel injector system being responsive to said control pulses to provide a plurality of fuel injections for each cylinder, the number of said fuel injections being a function of the number of said control pulses during the portion of the engine cycle.

2. The improvement of claim 1 wherein said duration control signal is a function of an engine parameter so that the duration of said injection period timing signal is a function of said engine parameter.

3. The improvement of claim 1 wherein said pulse repetition rate signal is a function of an engine parameter so that the number of said pulses in said plurality of pulses is a function of said engine parameter.

4. The improvement of claim 1 further characterized by:

power means coupled to said control pulses to provide a plurality of power pulses corresponding to said plurality of control pulses for actuating said injector system, and
    means to provide a pulse width signal, said power means being coupled to said pulse width signal to determine the width of each one of said plurality of power pulses as a function of said pulse width signal.

5. The improvement of claim 4 wherein:

said duration control signal is a function of a first engine parameter so that the duration of said injection period timing signal is a function of said first engine parameter,
    said pulse repetition rate signal is a function of a second engine parameter so that the number of said pulses in said plurality of control pulses is a function of said second engine parameter, and
    said pulse width signal is a function of a third engine parameter so that the width of said power pulses is a function of said third engine parameter.

6. The improvement of claim 5 further characterized by:

means to provide an advance signal, said position detector being coupled to said advance signal to modify the timing of said position signal as a function of said advance signal.

7. The improvement of claim 5 further characterized by:

means to provide an electrical advance signal, said timing means being coupled to said electrical advance signal to modify said start of said injection period timing signal as a function of said electrical advance signal.

8. The improvement of claim 6 wherein said advance signal is a function of a fourth engine parameter.

9. The improvement of claim 7 wherein said electrical advance signal is a function of a fourth engine parameter.

10. The improvement of claim 2 wherein said timing means comprises:
  a monostable circuit, having a stable state and an unstable state, adapted to generate said injection period timing signal when in said unstable state, and
  time constant means adapted to vary the time during which said monostable circuit is in said unstable state, said time constant means being coupled to said duration control signal.

11. The improvement of claim 10 wherein said monostable circuit comprises:
  a first transistor, and
  a second transistor complementary to said first transistor,
  said transistors being interconnected in such a manner that said first and second transistors are simultaneously blocked and simultaneously conducting.

12. The improvement of claim 3 wherein said pulse generating means comprises:
  a unijunction transistor adapted to furnish said control pulse for the duration of said injection period timing signal, and
  repetition rate adjustment means adapted to change the total number of said control pulses generated within the duration of said injection period timing signal by adjusting the repetition frequency of said control pulses, said adjustment means being coupled to said pulse repetition rate signal.

13. The improvement of claim 12 wherein said repetition rate adjustment means comprises:
  a resistor-capacitor circuit connected to the emitter of said unijunction transistor, and resistor being a variable resistor, the resistance of said resistor being adjustable as a function of said pulse repetition rate signal.

14. The improvement of claim 4, wherein said power means comprises:
  a power transistor having a conducting state and a non-conducting state, and
  monostable control means having a stable state and an unstable state, said monostable control means being coupled to said control pulses so that said state of said monostable control means is determined by the presence of a control pulse, said monostable control means being coupled to said power transistor into one of its states as a function of the state of said monostable control means.

15. The improvement of claim 14 wherein said monostable control means comprises:
  a first control transistor, and
  a second control transistor,
  said control transistors being interconnected in such a manner that said control transistors are simultaneously in a conducting state and simultaneously in a non-conducting state,
  said first and second control transistors being further coupled to said power transistor to cause said conducting and non-conducting states of said power transistor to correspond respectively to the conducting and non-conducting states of said control transistors.

References Cited

UNITED STATES PATENTS

| | | | |
|---|---|---|---|
| 2,815,009 | 12/1957 | Pribble | 123—32 |
| 2,875,744 | 3/1959 | Gunkel | 123—32 XR |
| 2,884,916 | 5/1959 | Winkler. | |
| 2,910,054 | 10/1959 | Schutte. | |
| 2,941,519 | 6/1960 | Zechnall et al. | |
| 2,992,640 | 7/1961 | Knapp | 123—119 |
| 3,020,897 | 2/1962 | Sekine et al. | |
| 3,272,187 | 9/1966 | Westbrook et al. | |

LAURENCE M. GOODRIDGE, *Primary Examiner.*

U.S. Cl. X.R.

123—140